(12) United States Patent
Lorenz et al.

(10) Patent No.: US 6,408,366 B1
(45) Date of Patent: Jun. 18, 2002

(54) INTERFACE DEVICE, METHOD AND MONITORING SYSTEM FOR MONITORING THE STATUS OF A HARDWARE DEVICE

(75) Inventors: Stefan Lorenz, Älvsjö (SE); Alexander Wassew, Hildesheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/280,984

(22) Filed: Mar. 30, 1999

(30) Foreign Application Priority Data

Mar. 31, 1998 (DE) .......................................... 198 14 359

(51) Int. Cl.7 ............................................. G06F 12/00
(52) U.S. Cl. ..................... 711/156; 711/165; 711/202
(58) Field of Search .................................. 711/165, 202, 711/156

(56) References Cited

U.S. PATENT DOCUMENTS

| | | | |
|---|---|---|---|
| 4,167,041 A | 9/1979 | Curlander et al. ............. | 714/48 |
| 4,943,905 A | 7/1990 | Iwagaya et al. ................ | 700/7 |
| 5,008,834 A | 4/1991 | Mizuno et al. ............. | 700/257 |
| 5,424,956 A | 6/1995 | Akamaru ..................... | 700/117 |
| 5,713,036 A | 1/1998 | Kamiguchi et al. ......... | 700/108 |

FOREIGN PATENT DOCUMENTS

EP 0 604 091 A2 6/1994

OTHER PUBLICATIONS

Search Report for PCT/EP99/02226, completed Aug. 2, 1999.

*Primary Examiner*—Reginald G. Bragdon
(74) *Attorney, Agent, or Firm*—Jenkens & Gilchrist, P.C.

(57) ABSTRACT

A monitoring processing device (SW) comprises a plurality of process means (A, B, C) which monitor a status of a hardware device (HW) by reading status information from an interface device (ID) via respective accesses (SAA, SAB, SAC). According to the invention the interface device (ID) comprises a first memory (MEM1), a mapping means (MAP) and a plurality of second memories (MEM21, MEM22, MEM23). The mapping means (MAP) uses a predefined mapping pattern (MPN) to map at least a part of a status information stored in the first memory (MEM1) as a bit pattern to at least one second memory (MEM21, MEM22, MEM23). Thus, each process means (A, B, C) is provided flexibly and individually with its own status information which cannot be disturbed by other process means. Thus, an accurate provision of status information in a flexible manner is achieved.

42 Claims, 2 Drawing Sheets

INTERFACE DEVICE, METHOD AND MONITORING SYSTEM FOR MONITORING THE STATUS OF A HARDWARE DEVICE

FIELD OF THE INVENTION

The present invention relates to an interface device, a method and a monitoring system for providing status information about the status of a hardware device to a plurality of process means. The invention particularly addresses the problem how the status information about the current state of a hardware device can be simultaneously and independently provided to several process means which may each require an access to at least a part of said status information or to the complete status information.

BACKGROUND OF THE INVENTION

In many applications it is necessary to supervise the state of a hardware device. For example, if the hardware device is a machining apparatus, a control device (e.g. a control computer) needs to know whether the machining tool of the machining apparatus has responded correctly to a command issued by the control device. Therefore, the machining tool outputs a status information to the control device which indicates the current status of the machining tool, i.e. whether it is currently executing a cutting operation, a drilling operation etc. Furthermore, the status information may indicate the positioning of the machining tool with respect to a workpiece.

Furthermore, in most microprocessor controlled hardware devices there is provided a status register into which the hardware device writes the current status information of the hardware device. This is for example of particular importance in multi-tasking systems where it is essential to have an exact knowledge about each task's current status such that another task is correctly timed.

There is no problem when a status memory is provided into which the status information is written and if there is only one process means (e.g. a computer) which once accesses this status information in the status memory and subsequently processes said status information. Whenever a new status information is written into the status memory the process means can read out the status information and perform the processing thereof, the aim being to detect when a change in the status information has occurred.

As will be explained below with further details, a non-latching or a latching status memory may be used. In a non-latched status memory the status information always exactly reflects the current status of the hardware device, i.e. the status information is not held in the memory up to the next polling timing where the memory is polled. By contrast, in a latching memory the status information is set according to the current status of the hardware device, however, it is held (i.e. latched) in the status memory up to the next polling timing (i.e. rending). After being polled the status information in the status memory is reset and is only set with the next change of the status of the hardware device.

Thus, the polling process means detects the change of a status (i.e. an operation state) of said hardware device even when the state of the hardware device has changed from a state B to state A and back to state A inbetween two polling cycles. This is shown in FIG. 4. When a process mean reads the state before t0 (1. polling cycle) and then at t2 (next polling cycle) the process mean will read state B at both cycles in case of non-latched memory. So the temporary state-A (during t0 to t1) will not be detected.

In case of latched memory the process mean will detect state A at time t2 although the hardware state has already changed back to state B.

The usage of a non-latching memory results in the disadvantage that the process means can not detect the status change described before. As opposed to the usage of non-latching memories, the latched memory has the advantage that the status of the hardware device is at least kept in the memory until the first polling, since after a change of status the information is held in the memory. However, in this case the status information in the memory is reset when a polling is executed such that the information can only be read by one single process means.

The status information itself may be quite complex information and it may be necessary that several independent process means successively or simultaneously access said status information. If for example the status information relates to different operation states of the machining apparatus discussed above, then such status information may contain a first information relating to the "drilling state", a second information relating to the "cutting state" and a third information relating to the "positioning state". Since the machine tool might be controlled by several independent process means, for example one for the drilling operation and one for the cutting operation, a part of the entire status information relating to the "positioning state" must be accessible by the drilling process means as well as the cutting process means, sequentially or even simultaneously.

Most importantly, the individual independent process means may have different clock rates for access operation, such that accidentally two process means may access the same status information (or a part of it) such that a collision occurs. Furthermore, in case the status memory is based on a latching memory, the status information will be reset by one process means making it impossible for a second process means to read this information again, since it will be reset by the first process means.

Often the state information is set and reset as individual status or indication bits in the memory. They may be set/reset individually or as one word consisting of a number of indication bits at predetermined bit positions in the memory.

FIG. 3 shows the problems described above with more details when individual bits are used as status information in a memory. In FIG. 3 there is shown a hardware device HW which includes an interface device ID through which status information about the status of the hardware device HW is communicated to a monitoring processing device SW which comprises several process means A, B, C. The interface device ID comprises a memory MEM1 with a number m of registers $REG1_1, \ldots, REG1_m$. Each register can hold k indication bits, indicated with a dot. The indications are thus assembled bit-wise in the memory registers. The registers may be latched or non-latched. The three process means A, B, C can access (e.g. via a software access) SAA, SAB, SAC each register of the memory MEM1 to read out the indication bits for further processing. The registers can only be read entirely by the monitoring processing device SW, i.e. its respective process means A, B, C. Assuming k=4 in FIG. 3, this means that always all four bits of a register are read if a register is accessed and if it is a latching register all status information is reset. That is, the hardware device HW continuously writes bits into a register as a part of the complete status information, wherein all bits stored in all registers form the complete current status information about a current status of the hardware device HW. The bits can be independently written and may individually change at different times.

Although in FIG. 3 the interface device ID is shown as being part of the hardware device HW, it may also be situated in the monitoring processing device SW or between the hardware device HW and the monitoring processing device SW. A monitoring system SYS is formed by the monitoring processing device SW and at least the interface device ID.

As indicated above, the indication registers $REG1_1, \ldots, REG1_m$ can be latched or non-latched, and FIG. 4 shows a timing diagram for both cases. The top graph indicates the current state of the hardware device HW. At times t0, $t_1$, $t_3$ a change of the current state of the hardware HW occurs, namely from a state B to a state A at time t0, from a state A to a state B at time $t_1$ and from a state B to a state A at time t3.

In the memory MEM1 state A and state B will respectively be indicated by a particular combination of bits A, B in the individual registers $REG1_1, \ldots, REG1_m$. As is indicated with the middle graph in FIG. 4, a non-latched indication register represents the current status of the hardware device HW, since the state in the non-latched register always follows the state of the hardware device HW. A bit or state in a latched indication register will stay active until it is read by the monitoring processing device SW at time $t_2$, i.e. a reading operation to the memory MEM1 resets a latched indication bit (or latched indication state). The current status can be determined from a latched register or latched memory by reading the register twice at time $t_2$ and $t_4$. For example, if at time t2 the latched register is read out by the monitoring processing device SW two times, then state B is read at second read. This state is identical to the current state of the hardware at that time. If at time t2 the latched register is read out once only, then state A will be read and the register will be reset to state B.

Whilst FIG. 4 only shows the situation when a single process means of the monitoring processing device SW accesses the memory MEM1 (or its respective registers), the monitoring processing device SW can handle the indications in several ways. In particular, the concurrent access SAA, SAB, SAC of several process means A, B, C or even the succeeding access of these process means cause severe problems, i.e. the status information cannot be accurately provided simultaneously and/or successively to said individual process means A, B, C of said monitoring processing device.

Namely, as is indicated in FIG. 3 the process means A, B, C may each use a different polling or clock rate such that the information in the interface device may under some circumstances not be provided accurately to each process means. For example, the process means A may use a clock rate of 100 ms, the process means B a clock rate of 1 minute and the process means C a clock rate of 10 min. It is clear that a collision can then occur in the following four cases.

Firstly, several process means A, B, C may be interested in the current status or the latched status. Then, the access by one process means (e.g. the "fastest" process means A) to a latched register obviously destroys the latched status for other supposedly "slower" process means.

Secondly, as explained above, since not all process means may require access to the entire status information, only a part of the entire status information may be provided to an individual process means. That is, several process means may be interested in different bits (parts of the status information) of a register. Then, the access by one process means to the register destroys the latched state for other processes interested in other indication bits of the same register, since the complete status information (in one register or in the memory) is reset even when a single individual indication bit is read.

Thirdly, several process means A, B, C may be interested in the same bit of a register. Then the access by one process means to the register destroys the latched status for other process means interested in the same indication bit.

Fourthly, the entire status information consists of individual parts which may be stored as a sub-set of bits in one register or even as a set of bits distributed (located) in bit positions of several separate registers. Then, an access to many registers is required. That is, assuming that a part of the status information is indicated by a combination of several bits situated at bit position 1 in register $REG1_1, \ldots REG1_2, REG1_3$ the process means has to read three bit positions from three separate registers. This may be done in parallel, but in most applications the SW device can only access one register at a time. So the registers have to be read sequentially, the state of the hardware device might change already such that after reading the bit position 1 at register $REG1_1$, the bit located at bit position 1 of register $REG1_3$ may already relate to the next status of the hardware device.

Thus, it should be understood that not each process means A, B, C has a need to be provided with the entire status information stored in the memory MEM1, but that some of the process means or all of them may only require an access to a part of the status information located in one register or being assembled from individual parts of several registers.

Despite the process means A, B, C each have their own access means SAA, SAB, SAC which respectively specify which part of the status information is to be read out from the MEM1, there are severe collision problems if several processes A, B, C simultaneously or sequentially access the indication data (the bits) in the memory MEM1, as explained above. One can say that the register structure presented by the interface device ID is not matched to the structure required by the monitoring processing device SW, i.e. the access specification SAA, SAB, SAC used by the individual process means A, B, C. The result is a lower performance (large access times) and complicated structures of the process means with all its consequences of increased processing times and high costs.

It should also be noted that in FIG. 3 the process means A, B, C forming the monitoring processing device SW can be individual processing programs realized in hardware or software. In fact, the complete monitoring processing device SW may be a software SW that contains several processing programs. As explained above, such programs can for example be employed in a multi-tasking environment. However, such processing programs may also be realized by hardware, such that the monitoring processing device is not restricted to a software realization, but also a hardware realization are within the scope of the invention.

SUMMARY OF THE INVENTION

As explained above with reference to FIGS. 3, 4, the individual process means A, B, C may have different access requirements, i.e. they must be provided with the status information (or part of it) differently. For example process means A may only be interested in bits 2, 3 in register $REG1_1$, whilst process means C may only be interested in the bits stored in the last two registers at bit positions 1, k. However, reading bits 2, 3 by the process means A already resets the status and therefore process means C (having a slower clock rate) cannot access this information again. Also collisions may occur if several process means access one or a number of bits simultaneously.

Therefore, the object of the present invention is to provide an interface device, a method and a monitoring system such that each one of a plurality of process means can be provided accurately with the status information (or at least a part of it) which it requests according to its access specification.

The interface device, the method and the system of the invention for providing status information about a status of a hardware device to a plurality of process means of a monitoring recessing device comprise a first memory storing a status information about a current status of the hardware device, a plurality of second memories each being accessible by a respective one of the process means and a mapping means for copying at least a part of said current status information stored in said first memory to at least one of said second memories according to a predetermined mapping pattern specifying which part of said current status information is to be copied into which second memory.

According to the invention the interface device comprises a first memory and second memories which are each assigned to a specific process means of the process means in the monitoring processing device. The hardware device writes status information about a status of the hardware device into the first memory. The mapping means copies the status information in the first memory to at least one second memory according to the mapping pattern. Since the first memory and the second memories are decoupled, each process means can be provided with the status information (or a part of it) which it requires. In the simplest case each second memory will contain the complete status information, however, if a process means which runs at a higher polling rate reads the status information from its associated process means, the status information is still available in other memories dedicated to other process means which might run at a lower clock rate. Thus, each process means can independently read and process the status information (or a part of it, which is requests according to its specific needs).

Preferably, the first memory and the second memories each comprise a number of registers and the mapping pattern specifies which part of the first register in the first memory should be copied to specific second registers on the second memories. Thus, even status information which is assembled from different parts of different first registers can be copied to one second memory and can thus individually be provided for the associated process means. The number of the registers in the first memory and the second memories can differ from each other, since some of the process means may require a different part of the status information having a different size. If the number of registers in the first memory and the number of registers in a second memory is the same, then the complete status information from the first memory can be provided to the process means associated with this second memory.

The status information may be stored as individual bits in each register and the mapping pattern predetermines the bit positions, even from several different registers simultaneously, which should together be copied to one second memory (i.e. its respective registers).

A set up means may be provided for setting predetermined mapping patterns in said mapping means. Thus, even when the individual process means are not changed, programs or algorithms for processing the status information may require different parts of the status information at different times. By merely changing the mapping pattern, an immediate provision of this new part of the status information can be provided to the respective process means. Therefore, a flexible assignment of the status information to the individual process means can be achieved.

The mapping means may copy a bit to the second memory as soon as it has been set by the hardware device in the first memory. Thus, some of the second memories may contain an immediate real-time image of the status (or a part of the status) of the hardware device. Alternatively, the mapping means only reads a status information from a first register, if a complete new word (consisting of a predetermined number of bits) has been written into it.

Since the first and second memories are decoupled the respective memories can be of an arbitrary type. For example, the second memory may be of a non-latching type, wherein the process means associated with it can always read the current status information which is copied by the mapping means. Alternatively, the second memories may be of a latching type, such that the state in the second memory is reset after the process means has read the status information therein. Preferably, the first memory is a non-latching memory and said second memories are each latching memories.

Further advantageous embodiments and improvements of the invention may be taken from the dependent claims. Hereinafter, the invention will be explained with respect to its embodiments and with reference to the attached drawings.

BRIEF DESCRIPTION OF THE DRAWINGS

In the drawings the same or similar reference numerals designate the same or similar parts throughout the description. In the drawings

FIRST EMBODIMENT

Figures 1, 2:
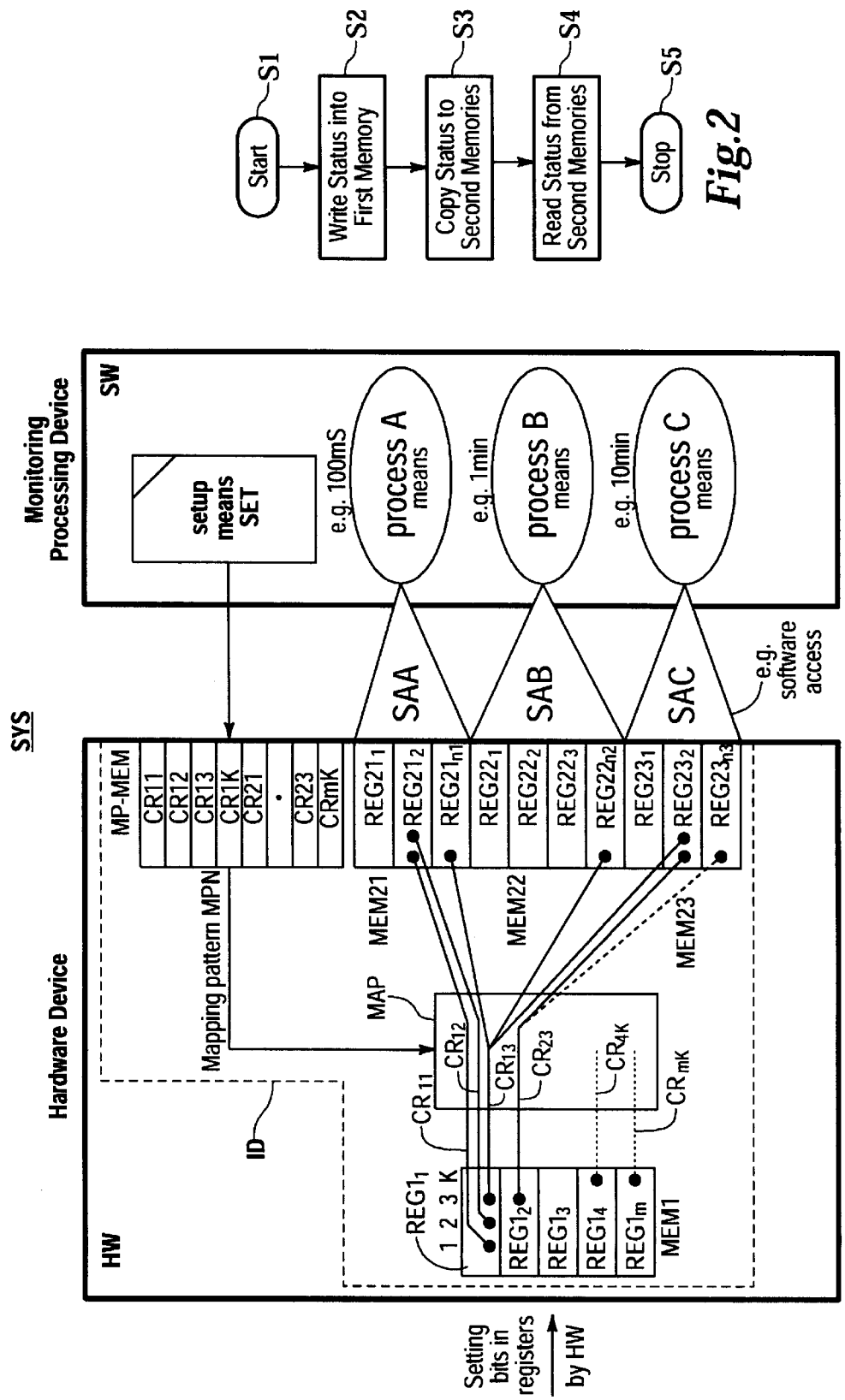
FIG. 1 shows an interface device ID and a monitoring processing device SW including a plurality of process means according to the invention.
FIG. 2 shows a flowchart of the method according to the invention.

FIG. 1 shows an overview of a system SYS for monitoring the status of a hardware device HW including a monitoring processing device SW and an interface device ID according to the invention. As in FIG. 3 the first memory MEM1 stores a status information about a current status of the hardware device HW. The status information is represented by the bits in the memory MEM1 which are set by the hardware device HW. A part of the status information may comprise all bits $1, 2, 3, \ldots, k$ of one register (e.g. $REG1_1$), individual bits of one register, e.g. bits 1, 2 of the register $REG1_1$, or a combination of bits from several registers.

Figure 3:
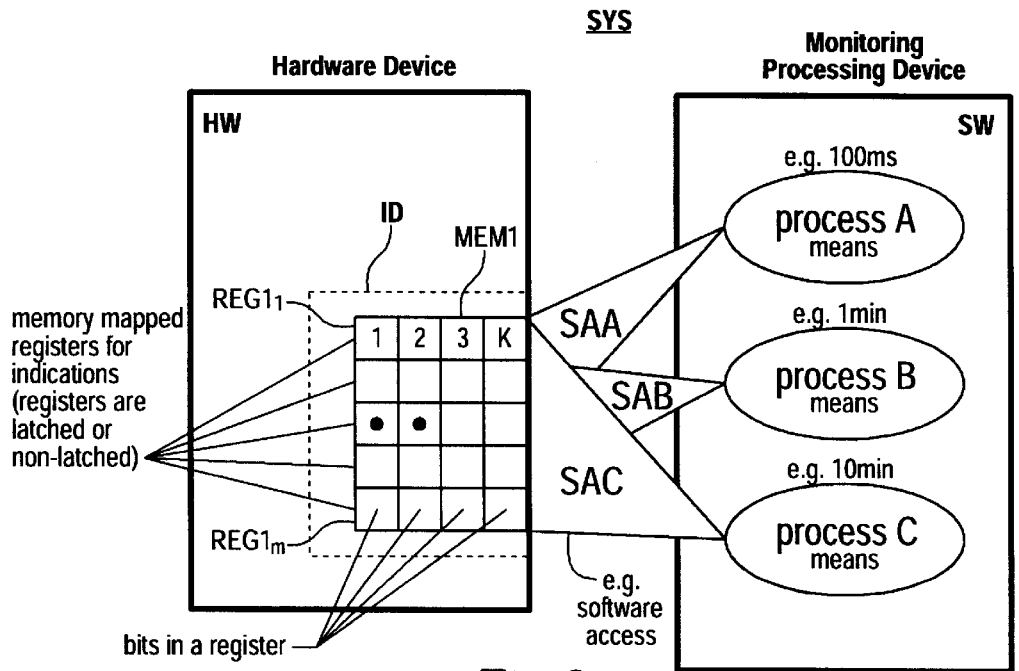
FIG. 3 shows an interface device and a monitoring processing device including a plurality of process means according to the prior art.

In addition to the interface device ID in FIG. 3, the interface device ID of FIG. 1 comprises a plurality of second memories MEM21, MEM20, MEM23 which are each accessible by a respective process means A, B, C of said monitoring processing device SW. As is shown in FIG. 1, an individual process means A, B, C performs a respective access operation SAA, SAB, SAC only to its respectively associated second memory MEM21, MEM22, and MEM23. Of course, the memories respectively associated with the process means A, B, C may be formed by a single memory.

In FIG. 1, a mapping means MAP copies at least a part of said current status information stored in said first memory MEM1 to at least one of said second memories MEM21, MEM22, MEM23 according to a predetermined mapping pattern MPN. Essentially, the mapping pattern MPN specifies which part of said current status information is to be copied into which second memory MEM21, MEM22, MEM23 as is schematically indicated with the copy rules CR11, CR12, CR13, . . . , CRmk. Thus, the mapping pattern MPN determines how a part or the complete status information stored in the first memory is copied to one or a plurality of second memories.

The introduction of the mapping means in the interface device ID solves the above-described problems. Since in FIG. 1 a single independent second memory MEM21, MEM22, MEM23 is assigned to each independent process means A, B, C, the process means do not interfere with each other since they only access their respectively associated second memory. For example, the process means A may read or poll status information stored in its associated second memory MEM21 at a much higher polling or clock rate than the process means B and no problem occurs, since individual status information is provided in the second memory MEM21 exclusively according to the access specifications of the process means A. Thus, each process means will individually be provided with the part of the status information it needs to process.

If for example in FIG. 2 a new status has been written into the first memory in step S2 (FIG. 2) by said hardware device HW, the mapping means MAP selects a part of the newly set status information (or the entire status information) in the first memory MEM1 in accordance with the mapping or copying pattern MPN in step S3. Furthermore, in step S3 the so-selected status information (or a part of it) is copied to at least one second memory as also indicated in the mapping pattern MPN. In step S4 the respective process means A, B, C reads status information from the associated second memory MEM21, MEM22, MEM23 via an access operation SAA, SAB, SAC. Thus, via the mapping pattern MPN the process means are respectively only provided with the part of the status information stored in the first memory which it really wants to process. Since the second memories are provided independently, no collision between accesses of the individual process means can occur.

Apart from selecting a specific part of the current status information stored in said first memory to be copied to one or more of said second memories, it is of course possible to always copy the entire status information in the first memory MEM1 to all second memories MEM21, MEM22, MEM23 wherein in this case all memories must have at least the same size. Even when the entire status information is copied according to the mapping pattern MPN, the process means (e.g. A) might nonetheless decide that it only reads a part of the current status information stored in its second memory MEM21 similarly to the case in FIG. 3, only that in FIG. 1 the process means reads from its own specially dedicated second memory MEM21.

The size of the respective memories MEM21, MEM22, MEM23 is predefined according to the mapping pattern MPN. If the mapping pattern MPN indicates that the entire status information from the first memory is to be copied into each second memory, then the second memory MEM21, MEM22, MEM23 must at least have the same size as the first memory. However, since different process means A, B, C may request a different part of the current status information stored in the first memory MEM1, the size of the memories MEM21, MEM22, MEM23 is specifically set according to the size of the part of the status information to be stored therein according to the mapping pattern MPN. In FIG. 1 the second memories MEM21, MEM23 both have the same size (although they may store a different part of the status information as will be explained below) whilst the second memory MEM22 has a different size (and stores a different part of said current status information).

Since in the first embodiment the mapping means copies at least a part of said current status information stored in said first memory to at least one of said second memories according to the predetermined mapping pattern, the process means reading this part of the status information from its associated second memory cannot be disturbed by other reading operations which other process means perform to retrieve status information stored in their respective second memories.

Figure 4:
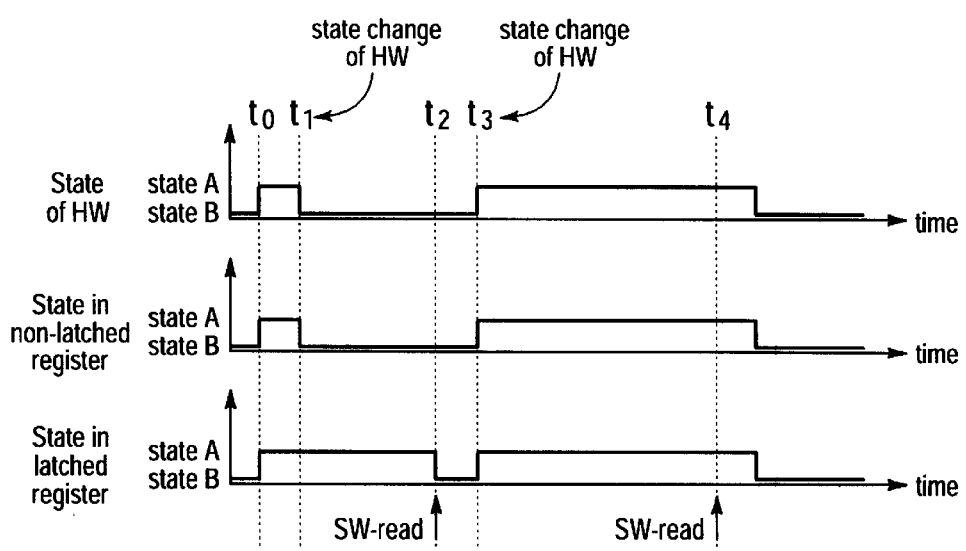
FIG. 4 is a timing diagram for explaining the change of status information in a non-latched register and a latched register when the state of a hardware device changes.

Since the first memory and the second memories are decoupled via the mapping means MAP, the first memory and the second memories may be selected as non-latching memories or latching memories. Preferably, the first register is a non-latched memory and said second memories are respectively latching memories. Consequently, when the process means performs two successive readings as illustrated in FIG. 4, it can immediately detect whether a current status of the hardware device HW has changed and it can rely on this information since no other process means B, C has an access to this status information.

SECOND EMBODIMENT

According to the second embodiment the first memory MEM1 comprises a number m of first registers REG1$_1$, REG1$_2$, REG1$_3$, . . . , REG1$_m$ and each second memory MEM21, MEM22, MEM23 comprises a respective number n1, n2, n3 of second registers REG21$_1$, REG21$_2$, REG21$_{n1}$; REG22$_1$, REG22$_2$, REG22$_3$, REG22$_{n2}$; REG23$_1$, REG23$_2$, REG23$_{n3}$. The mapping pattern further specifies into which second register of which second memory said part of said status information is to be copied.

In this case, said part of said status information may comprise the status information stored in a first register (e.g. REG1$_1$). Considering as the entire status information the complete information stored in all registers of the first memory MEM1, the part of the status information can also be assembled from a predetermined part from the register REG1$_1$, a predetermined part from another first register REG1$_3$ and the complete partial status information stored in the first register REG1$_m$. The mapping pattern MPN again selects such specific parts of the status information (or all of it) from the first memory MEM1 and assigns this selected partial (or complete) status information to at least one second register (or a plurality of second registers) of said second memories MEM21, MEM22, MEM23.

Regarding for example the bits 1, 2 in the first register REG1$_1$ as a partial status information, the mapping means MAP indeed maps these bits 1, 2 to bit positions 1, 2 in the register REG21$_2$ of the second memories MEM21. Here the order of the partial status information is maintained. However, as is seen with the partial status information indicated by the bit at bit position 3 in the first register REG1$_1$, this bit is actually copied to the bit position 1 in the register REG21$_{n1}$. If the hardware device HW for example writes bits (i.e. partial status information) into the first memory MEM1 always column-wise and shifts the previous entries to the next higher column position and the process means A also performs likewise a column-wise reading, then it is clear that the copy rules CR11, CR12, maintain the time position whilst the copy rule CR13 delays the bit from bit position 3 in the first register REG1$_1$ to the first bit position in the register REG21$_{n1}$.

If the number of second memories n1, n2, n3 is respectively the same as the number m of first registers, the mapping pattern MPN may indicate that the entire status information stored in all first registers is copied respectively to the second memories MEM21, MEM22, MEM23. However, as explained above, partial status information from a single first register or from a combination of entries in several first registers may be combined to form the respective partial status information which the respective process means desires to read. The part of the status information or the complete status information may be stored in the first and second memories as data entries of a specific length, as specific numbers or using any other indication suitable for indicating state changes of the hardware device HW.

Hereinafter, an embodiment will be described where the first register stores the status information as individual bits at individual bit positions in the registers.

THIRD EMBODIMENT

According to the third embodiment the status information stored in the first memory is indicated by single indication bits (indicated with a bold-face dot). That is, each first register $REG1_1$, $REG1_2$, $REG2_3$, . . . , $REG_m$ stores as a current status information a number k of indication bits (k: number of columns or depths of each first register) indicating said current status of said hardware device HW. In total the complete status information comprises m*k bits (m: number of rows).

Now, the mapping means MAP copies at least one of such indication bits from predetermined indication bit positions of at least one first register to predetermined indication bit positions of at least one second register of said second memory according to said mapping pattern MPN. The specification of which indication bits to select and copy from the first memory to predetermined indication bit positions of at least one second register is performed again according to the copy rules CRmk forming the mapping pattern MPN. Thus, the mapping means maps indication bits from the first registers to certain bit positions within the second registers. The second registers may be latched. Thus, a 1:n mapping, i.e. one indication bit is mapped to several n positions of the second memory, is performed. Therefore, partial status information from said first register as constituted by one or a number of bits from arbitrary bit positions in said first memory MEM1 can be selected and copied to predetermined bit positions in at least one and preferably several second memories MEM21, MEM22, MEM23.

For example, the copy rule CR11 copies the first bit in the first register $REG1_1$ to the first bit position of the second register $REG21_2$ of the second memory MEM21. Copy rule CR12 copies the second bit of the first register $REG1_1$ to the second bit position of the second register $REG21_2$. Likewise, the copy rule CR13 selects the third bit of the register $REG1_1$ and copies said bit to bit position 1 in the second register $REG21_{n1}$ of the second memory MEM21. Simultaneously the third bit is however copied to the first and second bit position of the second registers $REG22_{n2}$ and $REG23_2$ respectively. Copy rule CR23 copies the third bit of the first register $REG1_2$ to the first bit position of the second register $REG23_2$. Thus, the partial status information is selected as individual bits from individual bit positions in the first memory MEM1 according to the mapping pattern MPN and a (possibly differently set) pattern of the individual bits of this partial status information is then copied to predetermined indication bit positions in the second memories (into at least one of the second memories).

If the entire status information in the first memory MEM1 (i.e. all m*k bits of the first memory), are to be copied to predetermined bit positions in one second memory or several second memories, the mapping pattern MPN comprises m*k copy rules. As is indicated in FIG. 1 there are copy rules like CR11, CR12 which merely copy one bit of a bit position in the first memory to one bit position in a register of a second memory. Furthermore, there are also copy rules CR13 where one bit from a bit position in a first register is copied to several predetermined bit positions in one second memory or into several second memories (in FIG. 1 into three different second memories). Thus, the partial status information of the complete status information as constituted by some or all bits of the first memory can be copied (mapped) as it is to one of the second memories or to several second memories. However, the partial status information can also be reversed or rearranged to be stored in a different pattern in the second memories. Therefore, the copy rules CRmk really specify a kind of mapping pattern that maps a bit pattern of the first memory (as stored in the individual first registers) to a new bit pattern in the second memories, whereas the original bit pattern and the new bit pattern may be the same or may be different depending on how the copy rules CRmk specify the mapping. Thus, a bit pattern is generated in the second registers in a format as requested by the processing means adapted for reading the register.

The advantage of this mapping pattern is obviously that it need not necessarily be the case that each process means A, B, C requires the same partial status information from the first register in the same pattern, i.e. the process means A might want to have the partial status information stored in a first bit pattern, the process means B might require the same or a different status information (from the first memory) in a different bit pattern and again the third process means C might have the same bit pattern as the process means A or not. Therefore, the partial or full status information can be individually provided in the second memories in a format, which is specifically adapted to the needs of the respective process means associated therewith.

Thus, the inventive interface device ID can provide status information about a hardware device HW to a plurality of process means A, B, C of the monitoring processing device SW in the bit pattern or format which is specifically adapted to the needs of the respective process means. The process means cannot interfere with each other, since one process means cannot access a status information (bit pattern) specifically stored for another process means in another second memory. Therefore, not only are the second memories decoupled from the first memories such that first a writing in of bits into the first memory is performed and the information is then provided selectively to each second memories, but also the process means A, B, C themselves are decoupled from each other. Therefore, all status information can be provided to the process means accurately and without any mutual interference.

FOURTH EMBODIMENT

As described above, the mapping pattern MPN defines the mapping of the original bits in the first memory to respective bits in the second memories. Thus, each process means can be provided with its own individual bits. However, even during an operation of the process means, the requirements a process means has with respect to the requested bit pattern may change. That is, it would be desirable for the monitoring processing device SW to flexibly reset or set up the respective copy rules CRmk (i.e. the mapping pattern MPN) even when the requirements of the process means individually change.

According to another embodiment of the invention the monitoring processing device SW contains a set up means SET performing a resetting or setting of copy rules in the mapping pattern MP-MEM. Thus, even by only changing one of the copy rules CRmk, the mapping of the bit pattern in the first memory to the respective bit patterns in the second memories can be slightly altered.

For example, during a resetting the set up means SET could rewrite the copy rule CR23 such that is also copies the bit at bit position 3 in the second register $REG1_2$ to the first bit position in the third register $REG23_{n3}$ of the third second memory MEM23 as is indicated with the dashed line in FIG. 1, since the requirements of the process means C has changed.

Another example is when the mapping pattern MPN was previously set such that a particular partial status information (a partial bit pattern of bits) was copied (mapped) to one second memory and then the requirements change such that a process means requests the complete status information. In this case the set up means SET rewrites the mapping pattern MPN such that the complete bit pattern of the first memory MEM1 is mapped (copied) to the particular second memory associated with the process means requesting this complete status information. Obviously, in this case the size of the second memory (i.e. the size and the number of registers) must be such that it allows the storage of the partial status information as well as the complete status information.

If it is known beforehand that a process means will only request partial status information up to a certain size, then of course the number of the registers and the size of the registers of one particular second memory can be specifically made smaller for this second memory. Therefore, the number of bits (in the column direction) which can be stored in each register of the second memory may indeed be the same as the number of bits in the first memory, however they may also be different, again depending on the requirements of the process means.

FIFTH EMBODIMENT

Another embodiment of the mapping means MAP is to tie certain properties to a group of second indication registers (second registers). For example, an interrupt means may be connected to one or more of the second memories and will issue an interrupt as soon as a change in a register occurs. That is, whenever a new bit is set in the first memory MEM1 and is copied by the mapping means MAP, then an interrupt means will detect a change in a partial or complete status information in the second memory and will issue the interrupt, preferably to the associated process means.

Furthermore, specific registers may be provided with different access rights, i.e. specific registers may carry a flag that they can only be accessed in a supervisor or user mode which can be set in the respective process means.

SIXTH EMBODIMENT

Although the mapping pattern MPN as illustrated in FIG. 1 is only shown as containing several copy rules CRmk it should be noted that the mapping means MAP is not restricted to the mere copying (mapping) function. That is, the copy rules CRmk may be more complex functions, i.e. may relate to a processing of several bits to issue a new bit or several bits according to a predetermined processing rule. For example, the copy rule CR23 could also be modified to contain some kind of processing, for example to combine bits at bit position 3 in both registers $REG1_1$, $REG1_2$ such that the bit output to the bit position 1 in the second register $REG23_2$ is a "processed" bit as is indicated with the dashed line in FIG. 1. Thus, the mapping means MAP can already perform some kind of pre-processing during the mapping.

Any kind of processing can be performed by such a processing means of the mapping means MAP. For example, a mere logical combination like AND, OR or EXOR could be performed. Essentially, in this case, the second memories then contain an already "processed" status information (or a processed partial status information). Therefore, the mere copying function should not be seen limiting since another advantageous embodiment of the invention is indeed that at least some of the copy rules CRmk are modified as processing copying rules CRmk which either exclusively or partially perform a processing and/or a copying.

Furthermore, according to the requirements of the individual process means A, B, C the mapping means MAP, i.e. its copying and/or processing rules may be provided with time flags. That is, individual bits of the first memory can—as soon as they are set by said hardware device HW—be selected, however, they will only be copied to a bit position in a second memory after a predetermined time interval. The mapping means can also contain a further memory, in which such delayed bits may be stored for a predetermined period of time. For example, the process means A may read the bit position 1 of the register $REG21_2$ at a particular point in time and the mapping means already reads the bit at bit position 1 in the first register $REG1_1$ and as soon as the reading by the process means A is finished, the mapping means will write the new bit to the bit position. Alternatively, the writing of this bit can be further delayed, since the process means may require another bit copied by another copy rule first at this bit position and only then the selected bit at the bit position 1 in the first register $REG1_1$ is copied to this second register. Thus, individual bits can be provided with a time stamp.

The copying including a time information may also be combined with the processing feature where several bits may be combined to form a new bit. That is, also predetermined combinations of bits may be delayed until they are finally copied into this second memory.

Using individually different time stamps for individual copy rules CRmk can thus further contribute to providing the status information in the second memory not only in a (hardware) bit pattern format adapted to the respective process means, but also with a "time format" adapted to the time features of the processing performed by the respective process means.

INDUSTRIAL APPLICABILITY

As explained above, according to the invention the mapping means MAP uses a mapping pattern MPN for mapping the bit pattern of the first memory to several bit patterns in at least one second memory to map (copy) at least a selected partial status information (selected bits) to at least one second memory either with the original pattern or even with a different bit pattern. Advantageously the mapping pattern memory MP-MEM can be reset by a set up means SET to change the mapping pattern used by the mapping means MAP. Using the mapping means it is thus possible to have an "own" set of latched-registers (second registers) for each process or generally speaking, the monitoring processing device SW can group the bits according to its own needs as is shown in FIG. 1.

By introducing the mapping means (i.e. a mapping layer) the problems described above can be solved. In particular, the process means can flexibly be provided with status information according to the specific requirements. For example, if the requirements change during a product-life-cycle, then only a new mapping pattern MPN needs to be specified in order to handle the new requirements. When designing a hardware device HW the requirements by the monitoring processing device SW (for example a software program) need not necessarily be stable with respect to the SW-HW interface, i.e. when the requirements of the software program has changed then only the mapping pattern need to be rewritten. Furthermore, if several products comprises variations of the hardware device realization, then only the mapping pattern MPN need to be specifically designed for each hardware device or product. Thus, product variance using the same hardware device HW can be better supported. As explained above, the first and second memories and the process means are decoupled. Therefore, neither the writing of a new status information into the first memory nor the reading of a status information from the specifically associated second memory by one process means can disturb the writing and reading of status information from another second memory.

The invention is particularly advantageous for applications, where the monitoring processing device SW constitutes a software, wherein the process means A, B, C are respective software programs for monitoring the status of the hardware device HW. Furthermore, the mapping means MAP as well as the mapping pattern memory MP-MEM may be realized in software or hardware. For time critical applications a hardware solution is more practical due to the impacts on performance. Furthermore, it should be noted that the arrangement of the set up means SET as being part of the monitoring processing device SW as well as the arrangement of the interface device ID or parts of it within the hardware device HW only constitutes an example. The set up means SET as well as the interface ID or parts of it may be located outside the monitoring processing device SW or the hardware device HW.

Thus, the interface device, the method and the monitoring system according to the invention allow that each process means is provided with a tailored partial or complete status information in exactly the format which it requires. The invention can thus be used in any case where the status of a hardware device must be monitored or processed by a processing device having an access to a status register. This is particularly advantageous in all hardware devices controlled and monitored by microprocessors where the status of a hardware device is written as individual flags (bits) into a status register.

It should be noted that the description above only describes preferred embodiments of the invention and that the invention is not restricted to the described embodiments. Other modifications and verifications are obvious to a skilled person on the basis of the above teachings and the invention should not be construed as being limited to the disclosure herein.

What is claimed is:

1. An interface device for providing status information about a status of a hardware device to a plurality of means for processing of a monitoring processing device, comprising:

a first memory storing a status information about a current status of the hardware device;

a plurality of second memories each being accessible by a respective one of the means for processing; and a means for copying at least a part of said current status information stored in said first memory to at least one of said second memories according to a predetermined mapping pattern specifying which part of said current status information is to be copied into which second memory.

2. An interface device according to claim 1, wherein said first memory is a non-latching memory and said second memories are latching memories.

3. An interface device according to claim 1, wherein said first memory comprises a number of first registers and each second memory comprises a number of second registers and said mapping pattern further specifies into which second register of which second memory said part of said current status information is to be copied.

4. An interface device according to claim 3, wherein the number of said first registers in said first memory and the number of said second registers in each second memory is the same.

5. An interface device according to claim 4, wherein said means for copying copies the complete current status information stored in said first registers respectively to said second registers of each second memory.

6. An interface device according to claim 5, wherein each first register stores as current status information a number of indication bits indicating said current status of said hardware device and said means for copying copies indication bits from predetermined indication bit positions of at least one first register to predetermined indication bit positions of at least one second register of said second memory according to said mapping pattern, and said means for mapping copies all indication bits from all first registers respectively to corresponding indication bit positions of all second registers of all second memories.

7. An interface device according to claim 3, wherein each first register stores as current status information a number of indication bits indicating said current status of said hardware device and said means for copying copies indication bits from predetermined indication bit positions of at least one first register to predetermined indication bit positions of at least one second register of said second memory according to said mapping pattern.

8. An interface device according to claim 7, wherein each first register has a predetermined number of indication bit positions storing indication bits corresponding to one word of said current status information wherein said means for copying copies said indication bits from said indication bit positions only after a complete new word has been written into a respective first register by the hardware device.

9. An interface device according to claim 7, wherein each first register has a predetermined number of indication bit positions storing indication bits corresponding to one word of said current status information wherein said means for copying copies said indication bits from said indication bit positions whenever an indication bit position is newly set in a first register by the hardware device.

10. An interface device according to claim 3, wherein said status information defines one or a plurality of operation states of the hardware device; and each first register defines a different operation state of the hardware device.

11. An interface device according to claim 1, further comprising a mapping pattern memory for storing said mapping pattern and a means for setting said predetermined mapping pattern in said means for copying.

12. An interface device according to claim 1, wherein said status information defines one or a plurality of operation states of the hardware device.

13. An interface device according to claim 1, wherein said interface device is incorporated in said hardware device.

14. An interface according to claim 1, wherein said plurality of means for processing are software programs or hardware devices.

15. A method for providing a plurality of means for processing of a monitoring processing device with status information of a hardware device, comprising the following steps:

writing status information about a current status of the hardware device into a first memory;

copying at least a part of said current status information stored in the first memory to at least one of a plurality of second memories according to a predetermined mapping pattern specifying which part of said current status information is to be copied into which second memory; and reading said status information stored in each of said second memories by a respective means for processing.

16. A method according to claim 15, wherein said first memory is a non-latching memory and said second memories are latching memories, wherein, when said status information is copied to said second memories, said status information is maintained in said first memory, and, when said copied status information is read from said second memory, said status information is reset in said second memory.

17. A method according to claim 16, wherein said first memory comprises a number of first registers and each second memory comprises a number of second registers, wherein during said copying step said mapping pattern specifies into which second register of which second memory said part of said status information is to be copied.

18. A method according to claim 17, wherein the complete current status information stored in said first register is copied respectively to said second registers of each second memory.

19. A method according to claim 17, further comprising the step of writing as current status information into each first register a number of indication bits indicating said current status of the hardware device and copying indication bits from predetermined indication bit positions of at least one first register to predetermined indication bit positions of at least one second register of said second memory according to said mapping pattern.

20. A method according to claim 19, wherein all indication bits from all first registers are respectively copied to corresponding indication bit positions of all second registers of all second memories.

21. A method according to claim 19, further comprising the step of writing into each first register a predetermined number of indication bits corresponding to one word of said current status information wherein in said copying step indication bits are copied to said second registers only after a complete new word has been written into a respective first register.

22. A method according to claim 19, further comprising the step of writing into each first register a predetermined number of indication bits corresponding to one word of said current status information wherein in said copying step indication bits are copied whenever an indication bit position is newly set in a first register by the hardware device.

23. A method according to claim 15, further comprising the step of setting said predetermined mapping pattern in a mapping pattern memory of a mapping unit.

24. A system for monitoring the status of a hardware device, comprising:
an interface device including:
a first memory storing status information about a current status of the hardware device;
a plurality of second memories; and
a mapping unit for copying at least a part of said current status information stored in the first memory to at least one of said second memories according to a predetermined mapping pattern specifying which part of said current status information is to be copied into which second memory; and a monitoring processing device including a plurality of means for reading said copied current status information from a respective second memory.

25. A system according to claim 24, wherein said first memory is a non-latching memory and said second memories are latching memories.

26. A system according to claim 24, wherein said first memory comprises a number of first registers and each second memory comprises a number of second registers and said mapping pattern further specifies into which second register of which second memory said part of said status information is to be copied.

27. A system according to claim 26, wherein the number of said first registers in said first memory and the number of said second registers in each second memory is the same.

28. A system according to claim 26, wherein said mapping unit copies the complete current status information stored in said first registers respectively to said second registers of each second memory.

29. A system according to claim 26, wherein each first register stores as current status information a number of indication bits indicating said current status of said hardware device and said mapping unit copies indication bits from predetermined indication bit positions of at least one first register to predetermined indication bit positions of at least one second register of said second memory according to said mapping pattern.

30. A system according to claim 26, wherein each first register stores as current status information a number of indication bits indicating said current status of said hardware device and said mapping unit copies indication bits from predetermined indication bit positions of at least one first register to predetermined indication bit positions of at least one second register of said second memory according to said mapping pattern; and said mapping unit copies all indication bits from all first registers respectively to corresponding indication bit positions of all second registers of all second memories.

31. A system according to claim 26, wherein each first register has a predetermined number of indication bit positions storing indication bits corresponding to one word of said current status information, wherein said mapping unit copies said indication bits from said indication bit positions only after a complete new word has been written into a respective first register by said hardware device.

32. A system according to claim 26, wherein each first register has a predetermined number of indication bit positions storing indication bits corresponding to one word of said current status information wherein said mapping unit copies said indication bits from said indication bit positions wherever an indication bit position is newly set in a first register by said hardware device.

33. A system according to claim 26, wherein said status information defines one or a plurality of operation states of said hardware device and each first register defines a different operation state of said hardware device.

34. A system according to claim 24, wherein said interface device includes a mapping pattern memory for storing said mapping pattern and said monitoring processing device including a means for setting a predetermined mapping pattern in said mapping unit.

35. A system according to claim 24, wherein said status information defines one or a plurality of operation states of said hardware device.

36. A system according to claim 24, wherein said interface device is part of said hardware device.

37. A system according to claim 24, wherein said plurality of means for processing are software programs or hardware devices of said monitoring processing device.

38. An interface device for providing status information about a status of a hardware device to a plurality of means for processing of a monitoring processing device, comprising:

a first memory storing status information about a current status of the hardware device;

a plurality of second memories each being accessible by a respective one of the means for processing; and a mapping unit for copying at least a part of said current status information stored in said first memory to at least one of said second memories according to a predetermined mapping pattern specifying which part of said current status information is to be copied into which second memory, wherein said first memory is a non-latching memory and said second memories are latching memories.

39. An interface device for providing status information about a status of a hardware device to a plurality of means for processing of a monitoring processing device, comprising:

a first memory storing a status information about a current status of the hardware device;

a plurality of second memories each being accessible by a respective one of the means for processing; and a mapping unit for copying at least a part of said current status information stored in said first memory to at least one of said second memories according to a predetermined mapping pattern specifying which part of said current status information is to be copied into which second memory, wherein said first memory comprises a number of first registers and each second memory comprises a number of second registers and the mapping pattern further specifies into which second register of which second memory said part of said status information is to be copied; and wherein each of the first registers stores as current status information a number of indication bits indicating said current status of said hardware device and said mapping unit copies indication bits from predetermined indication bit positions of at least one first register to predetermined indication bit positions of at least one second register of said second memory according to said mapping pattern.

40. An interface device for providing status information about a status of a hardware device to a plurality of means for processing of a monitoring processing device, comprising:

a first memory storing a status information about a current status of the hardware device;

a plurality of second memories each being accessible by a respective one of the means for processing; and a mapping unit for copying at least a part of said current status information stored in said first memory to at least one of said second memories according to a predetermined mapping pattern specifying which part of said current status information is to be copied into which second memory, wherein said first memory comprises a number of first registers and each second memory comprises a number of second registers and said mapping pattern further specifies into which second register of which second memory said part of said status information is to be copied, wherein each first register stores as current status information a number of indication bits indicating said current status of said hardware device and said mapping unit copies the indication bits from predetermined indication bit positions of at least one first register to predetermined indication bit positions of at least one second register of said second memory according to said mapping pattern; and wherein each first register has a predetermined number of indication bit positions storing indication bits corresponding to one word of said current status information wherein said mapping unit copies said indication bits from the indication bit positions only after a complete new word has been written into a respective first register by the hardware device.

41. An interface device for providing status information about a status of a hardware device to a plurality of means for processing of a monitoring process device, comprising:

a first memory storing a status information about a current status of the hardware device;

a plurality of second memories each being accessible by a respective one of the means for processing; and a mapping unit for copying at least a part of said current status information stored in said first memory to at least one of said second memories according to a predetermined mapping pattern specifying which part of said current status information is to be copied into which second memory, wherein said first memory comprises a number of first registers and each second memory comprises a number of second registers and said mapping pattern further specifies into which second register of which second memory said part of said status information is to be copied, wherein each first register store as current status information a number of indication bits indicating said current status of said hardware device and said mapping unit copies indication bits from predetermined indication bit positions of at least one first register to predetermined indication bit positions of at least one second register of said second memory according to said mapping pattern; and wherein each first register has a predetermined number of indication bit positions storing indication bits corresponding to one word of said current status information wherein said mapping unit copies said indication bits from said indication bit positions whenever an indication bit position is newly set in a first register by the hardware device.

42. A system for monitoring the status of a hardware device, comprising:

an interface device including:
    a first memory storing status information of a current status of the hardware device;
    a plurality of second memories; and
    a mapping unit for copying at least a part of said current status information stored in said first memory to at least one of said second memories according to a predetermined mapping pattern specifying which part of said current status information is to be copied into which second memory; and a monitoring processing device including a plurality of means for reading said copied current status information from a respective second memory, wherein said first memory comprises a number of first registers and each second memory comprises a number of second registers and said mapping unit further specifies into which second register of which second memory said part of said status information is to be copied; and wherein each first register store as current status information a number of indication bits indicating said current status of said hardware device and said mapping unit copies indication bits from predetermined indication bit positions of at least one first register to predetermined indication bit positions of at least one second register of said second memory according to said mapping pattern.

* * * * *

UNITED STATES PATENT AND TRADEMARK OFFICE
CERTIFICATE OF CORRECTION

PATENT NO.    : 6,408,366 B1
DATED         : June 18, 2002
INVENTOR(S)   : Stefan Lorenz et al.

It is certified that error appears in the above-identified patent and that said Letters Patent is hereby corrected as shown below:

Column 3,
Line 28, replace "Identical to" with -- identically with --

Column 5,
Line 7, replace "recessing device" with -- processing device --

Signed and Sealed this

Eleventh Day of February, 2003

JAMES E. ROGAN
*Director of the United States Patent and Trademark Office*